Patented Oct. 13, 1925.

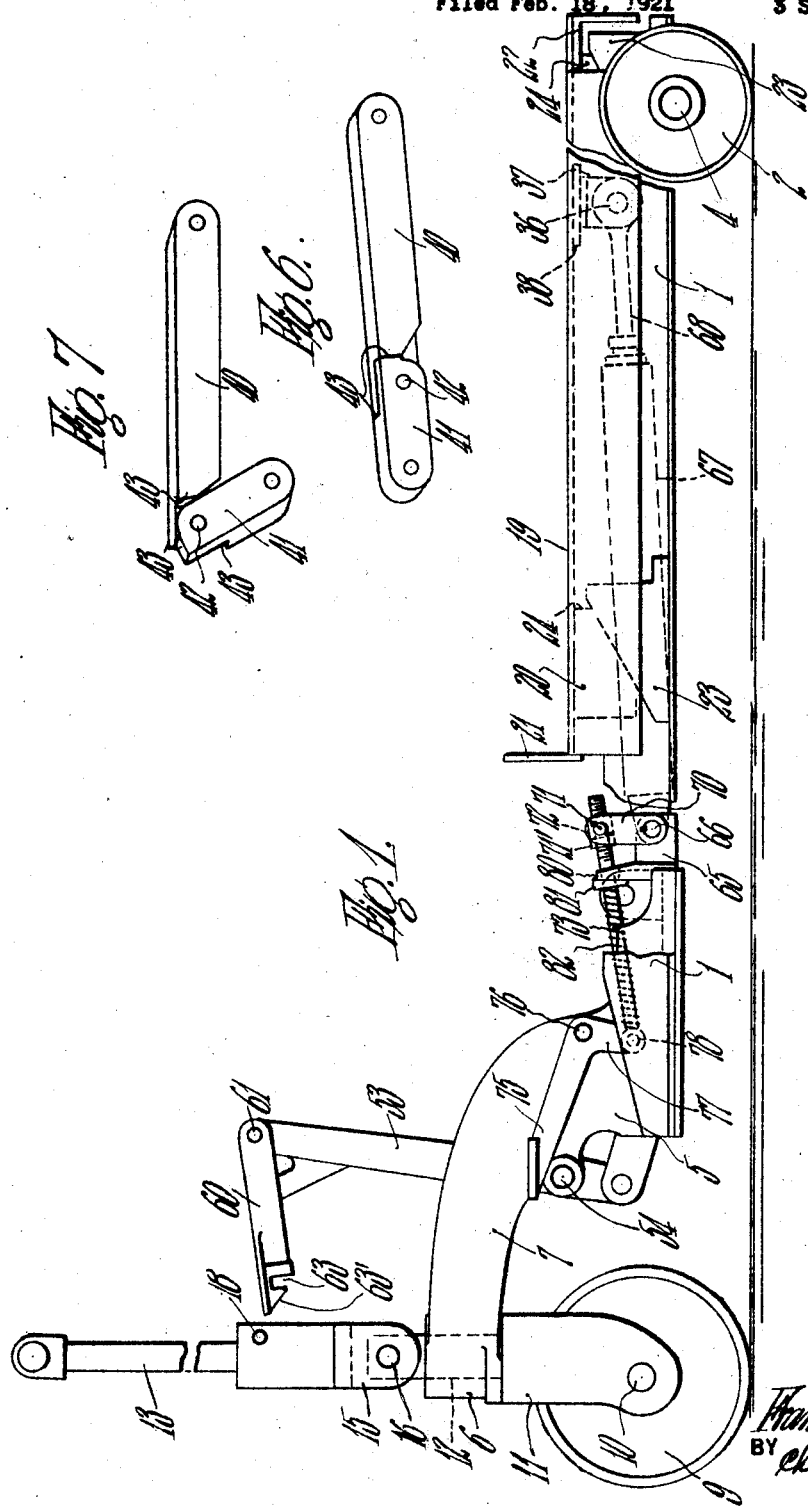

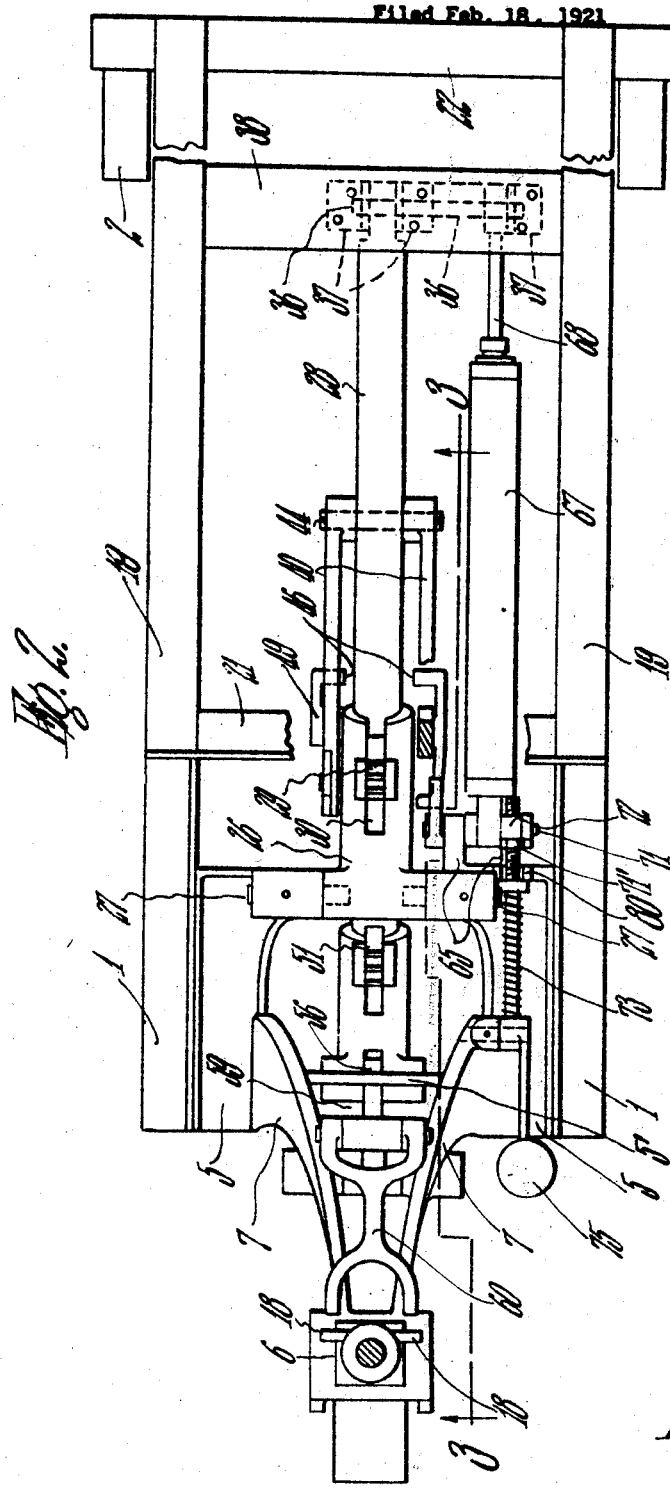

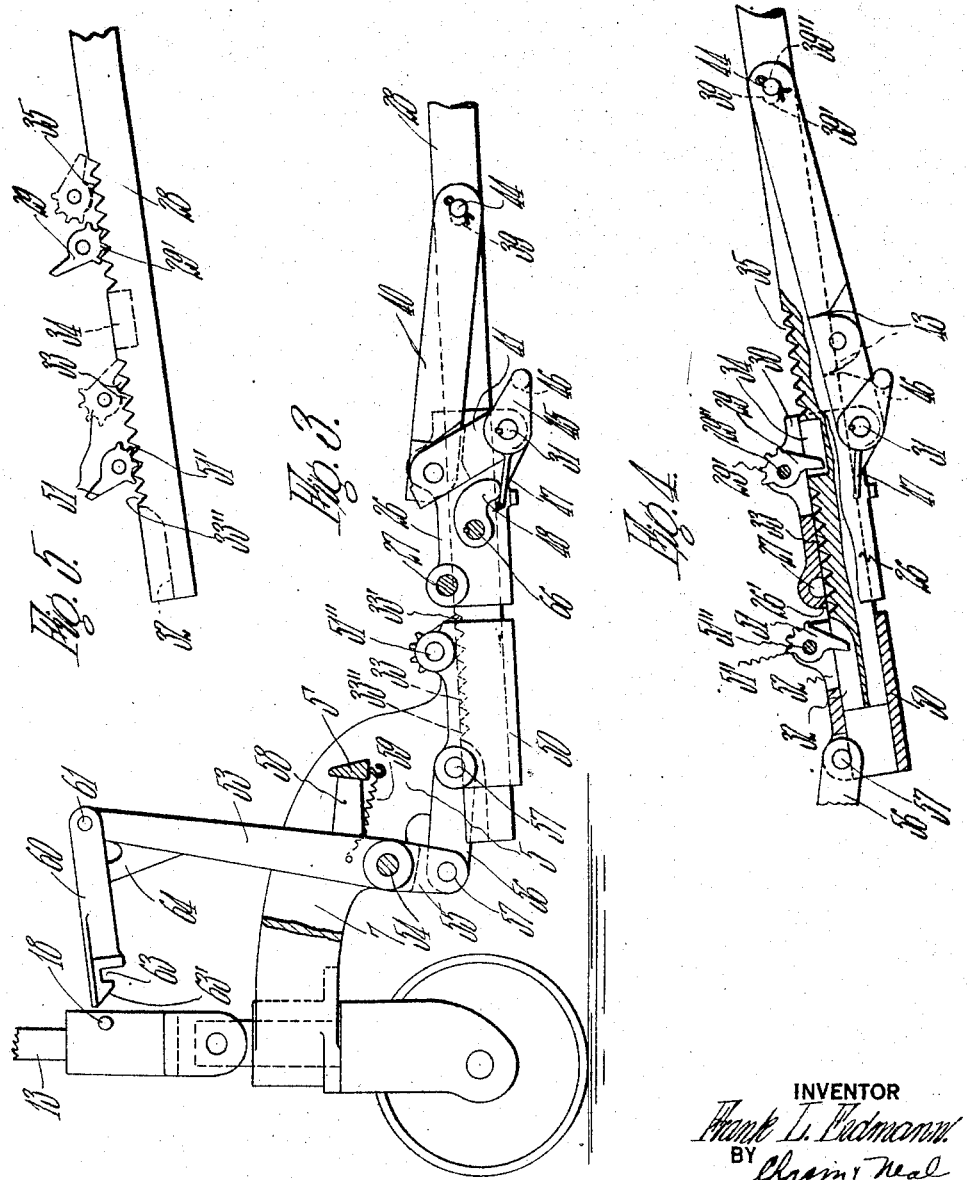

1,556,920

UNITED STATES PATENT OFFICE.

FRANK L. EIDMANN, OF NORTH BERGEN, NEW JERSEY, ASSIGNOR TO J. LEWIS WYCKOFF, EDWARD N. WHITE, AND JAMES M. EATON, ALL OF HOLYOKE, MASSACHUSETTS, TRUSTEES, DOING BUSINESS AS COWAN TRUCK COMPANY.

ELEVATING TRUCK.

Application filed February 18, 1921. Serial No. 445,924.

*To all whom it may concern:*

Be it known that I, FRANK L. EIDMANN, citizen of the United States, residing at North Bergen, in the county of Hudson and State of New Jersey, have invented new and useful Improvements in Elevating Trucks, of which the following is a specification.

This invention relates to improvements in elevating platform trucks and more particularly to the mechanism for effecting the elevation of the platform by a step by step movement, whereby exceptional heavy loads may be handled by man power.

The object of the invention is to improve, simplify and cheapen the construction of such trucks, so that a truck for heavy service may be provided at a minimum cost for maintenance and repair.

Other objects and advantages will appear in the following description. The preferred embodiment of the invention is illustrated in the accompanying drawings, in which Fig. 1 is an elevational view of a truck embodying my elevating mechanism;

Fig. 2 is a plan view of the same;

Fig. 3 is a sectional view on the line 3—3 of Fig. 2;

Fig. 4 is a detail view partly in section of the elevating mechanism;

Fig. 5 is a view of the elevating rod with pawls in various positions;

Fig. 6 is a perspective view of one of the locking links in a locked position; and Fig. 7 is a view of the same in a collapsed position.

The elevating mechanism is applicable to elevating trucks of the usual or well known type, one form of which will now be described with reference to Figs. 1 and 2.

A pair of side bars 1 in this instance consisting of angle bars comprise the truck frame. These side bars are supported at their rear ends by the wheels 2, which are rotatably mounted upon a suitable axle 4 carried into the side bars 1 in the usual and well known manner. The side bars 1 are further secured at their forward ends to a head 5 comprising forwardly and upwardly curved members 7 which provide at the front thereof a bearing 6 for the front wheel fork 11 swivelled therein in the usual manner. The forward steering wheel 9 is mounted on a suitable axle 10 carried in the fork 11, and the swivelled head 12 of the fork 11 is mounted in a suitable bearing of the boss 6 and has an integral portion extending above the bearing 6 as shown.

A steering handle 13 is bifurcated at its lower end at 15 and is pivotally connected to the swivelled head 12 of the fork 11 by pin 16 whereby it may freely swing up and down and be turned laterally for steering the truck. Laterally projecting studs 18 are fixed to the handle 13 for engagement with the raising mechanism as will later appear.

An elevating platform comprising the longitudinal bars 19 secured to the transverse bars 21 and 22 is supported for up and down movement on the truck by any suitable means such as by coacting wedges 23 and 24. The wedges 23 are rigidly secured to the lower side bars 1 and the wedges 24 are secured to the longitudinal bars 19 of the elevating platform. These wedges serve as in the patent to Taylor 1,121,052 of December 15, 1914, to raise the platform when it is moved longitudinally of the truck by the elevating mechanism hereinafter described. While I have shown and described wedges to accomplish the raising operation, it is obvious that other means may be employed such as the elevating links shown and described in the patent to Blackburn, Reissue 14,575 of December 24, 1918.

An elevating rod or jack post 28 is pivotally connected at its rear end by pin 36 to a bracket 37 of the rear cross bar 38 of the platform. The forward portion of the elevating rod is formed with rack teeth 33 and 35 as shown, and extends through a pair of sleeve like members 50 and 26, the former of which constitutes the actuating sleeve and the latter the holding and supporting sleeve for the rod 28.

The holding sleeve 26 is pivoted on trunnions 27 to the truck head 5 and is slotted at 30 upon its upper side as shown in Figs. 2 and 4. A holding pawl 29 pivoted at 29" on the sleeve 26 is adapted to extend through the slot 30 and engage the teeth 35 of the rod 28 for retaining said rod in its extended positions after each step by step movement thereof to the rear as will be hereinafter described. The rack teeth 35 of the rod 28 terminate in a cut away portion 34 into which the pawl 29 falls and becomes inactive after the rod 28 is fully extended to the rear in elevating the platform. Additional and independent platform holding means hereinafter described are in functioning position when the holding pawl 29 falls in the cut away portion 34 and becomes inactive. The holding pawl 29 is formed with a toothed segment 29' adapted to roll in engagement with the rack teeth 35 of the rod 28 during the movement of the latter to the left in lowering the platform and thus restore the holding pawl 29 to its operative position ready for holding engagement with said rod 28 after each depression of the platform (see Figs. 4 and 5).

The actuating sleeve 50 embraces the rod 28 for a reciprocating movement thereon and is also slotted at its upper rear end 52 as shown in Figs. 2 and 4. An actuating pawl 51 similar to holding pawl 29 is pivoted on sleeve 50 at 51'' adjacent the slot 52 and is adapted to extend through said slot 52 and engage the rack teeth 33 of the rod 28 for driving said rod to the right in a step by step manner during the reciprocation of the sleeve 50. The rack teeth 33 of the rod 28 also terminate in a cut away portion 32 in which the pawl 51 falls after the completion of the last elevating stroke, and said pawl 51 also has a segmental toothed portion 51' for rolling engagement with the rack teeth 33 for restoring the same to active position during the descending movement of rod 28 (see Figs. 4 and 5).

The preferred mechanism for reciprocating sleeve 50 on rod 28 is as follows:

A lever 53 is pivoted upon a shaft 54 of the head 5 and has a bifurcated or forked lower end 55. A link 56 connects the lever end 55 with the sleeve 50 by a pin 57. A lug 58 intermediate the ends of the lever 53 is adapted to abut the web 5' of the head 5 to limit the rearward movement of the lever 53. Preferably, a coil spring 59 to normally hold the lug 58 of the lever 53 in abutment with the web 5' of the head is provided as shown in Fig. 3. A hook 60 having both of its end portions bifurcated is mounted loosely upon the pin 61 of the lever 53 and has its free end formed with a hook portion 63 to engage the studs 18 of the tongue 13. The forward end of said hook portion 63 is bevelled at 63' to easily ride into engagement with pins 18 when the handle 13 is swung back. A stop 64 integral with the lever 53 is adapted to abut the hook 60 to retain the said hook 60 in a position to be easily engaged by the tongue 13.

A toggle lock, constituting what may be termed the final stage locking means, is provided to hold the platform after it has been fully elevated in the step by step manner described to its uppermost or final position and comprises a long link 40 and a short link 41 which are pivoted together at 42 as best shown in Figs. 6 and 7. These links 40 and 41 are each stepped to form coacting shoulders as at 43 to retain them in locked relation when extended as in Fig. 6 and to permit breaking of the toggle in one direction only as shown in Fig. 7. These toggle links are duplicated on each side of the rod 28 and have their short ends 41 loosely pivoted on shaft 31 carried by sleeve member 26. The long links 40 carry a pin 44 at the rear end thereof which extends through an elongated opening 39 of the rod 28.

The toggle breaking mechanism comprises a lever 45 keyed to the shaft 31 of the sleeve 26 as shown in Figs. 2 and 3, and having an arm 46 projecting laterally therefrom, beneath the short link 41 of the toggle. This lever 45 is also provided with a forwardly projecting lug 47 which is designed to be engaged by an arm 48 fixed to a rockable shaft 66. The shaft 66 is mounted in lugs 65 projecting from the head 5 see Figs. 1 and 2. A lever 49 similar to lever 45 is also secured to the shaft 31 at the opposite side of rod 28 and operates to engage its respective toggle link. These levers 45 and 49 which are secured to shaft 31 and each having a projection 46 adapted to engage the toggle links 41, are moved simultaneously by the arm 48 when shaft 66 is rocked in the manner now to be described.

A crank 70 is keyed to the shaft 66 and is located adjacent the outer face of the outer lug 65. A crank pin 71 carries a pivotal bearing block 72 through which slidably extends the threaded end of a rod 73. An adjustable abutting nut 71' threaded on the end of rod 73 is adapted to engage the block 72 on crank 70 to rock the latter clockwise. A foot lever 75 in the form of a bell crank is pivoted on the frame at 76, and its arm 77 is pivotally connected to the rod 73 at 78. An upstanding lug 80 of the head 5 is bifurcated and allows the rod 73 to pass therethrough. A washer 81 loosely mounted upon the rod 73 abuts the bifurcated lug 80 of the head 5 and serves as a step for a coil spring 82, which encircles the said rod 73 and normally tends to retain the foot lever in elevated or inoperative position. By depressing foot lever 75 it will be obvious that rod 73 through its engagement with crank 70 will rock shaft 66 and swing arm 48 (see Fig. 3) downwardly against lug 47. This action will rock arms 46 and 49 upwardly and if the toggle is locked as shown in Fig. 4 will cause the arms 46 and 49 to bear against links 41 and break the toggle thus allowing the platform to descend.

A cushioning check of the usual and well known dash pot type is provided to cushion the descent of the platform under load and preferably has its cylinder member 67 pivotally connected at its lower end to shaft 66 and its piston member 68 is pivotally connected to the pin 36, carried by the bracket 37 of the cross bar 38. This pin 36 it will be seen, supports both the piston member 68 and the elevating rod 28.

The truck is operated as follows:

When it is desired to elevate the platform, it is necessary that the handle 13 be connected to the hook member 60 of the elevating mechanism. The lever 60 is normally held in the position shown in Fig. 3 wherein it will be seen that the stop 58 of the lever 53 abuts the web 5' of the head 5, and when in this position the actuating pawl 51 of the sleeve 50 is held in operable engagement with tooth 33' of the rod 28 (see Fig. 3). The member 60 rests against the stop 64 normally in position so that when the handle 13 is swung backwardly, the pins 18 will ride against the bevelled nose 63' and automatically engage in hook member 63. When thus connected, the tongue 13 may be swung back and forth about its pivotal axis 16 to reciprocate the sleeve member on the rod 28 and by the coaction of pawl 51 with the teeth 33 of the rod 28, force the rod 28 backwardly in a step by step manner. The forward movement of the handle and the rearward movement of the sleeve 50 at each stroke is limited by the end of the pawl 51 abutting the sleeve member at a point indicated at 26' and when in this rearward relation the holding pawl 29 will engage a tooth 35 of the rod 28 and retain the same in the partially elevated position. The rearward movement of the handle 13 at each stroke is limited by the abutment of lug 58 against web 5' of the head which is sufficient to bring the pawl 51 into engagement with a successive tooth of rack 33. It will be observed also that the cushioning check 67, 68 will normally tend to retain the load elevated after each driving actuation of pawl 51 and thus permit said pawl 51 to engage a successive tooth on rack 33. It is preferable however to provide the additional holding pawl 29 as a positive retaining means. While the rod 28 and elevating platform carried thereby is thus completely elevated, the toggle mechanism 40 and 41 will have been straightened out to securely lock the platform in its elevated position. The handle 13 and link 60 may then be disconnected and the handle used to steer and pull the truck to different locations.

When the platform has been completely elevated as described, the actuating and holding pawls 51 and 39 will become disconnected from the elevating mechanism in the manner now described. The last stroke of the sleeve 50, in which stroke the pawl 51 engages the notch 33'', pushes the rod 28 rearwardly far enough so that the pawl 29 falls within the recess 34 of the rod 28.

During the raising of the platform 19 the jointed links 40 and 41 have moved step-by-step to a straightened out or locked position, and during the last stroke of the collar 50, the forward side 39' of the elongated slot 39 of the rod 28, engages the pin 44 of the links 40 and causes the links to extend into their locked position shown in Figs. 4 and 6 wherein the shoulders 43 of the links are in abutment. When the links 40, 41 are thus in their extended or locked position, and the sleeve 50 is moved forwardly by the tongue 13, and since the pawl 29 is out of engagement with the rod 28, the rod 28 also moves forwardly or descends until the other side 39'' of the slot 39 in the rod 28 abuts the pin 44 of the links. The weight of the platform 19 is now held in an elevated position by the toggle links being extended to their locked position and further forward movement of the collar 50 allows the pawl 51 carried thereby to fall within the recesses 32 of the rod 28 as in Fig. 4. The purpose of the elongated slot 39 in rod 28 is to permit the actuating pawl 51 in its last rearward stroke to give the rod 28 a slight overthrow with respect to the extended links 40 and 41 so as to insure that holding pawl 29 will fall into the recess 34 after the toggle links 40 and 41 are fully extended into their locking position. Any equivalent loose play connection between the locking toggle and the elevated platform sufficient to accomplish this result would be satisfactory.

To lower the platform 19 and to place the elevating mechanism in an operable position, it is only necessary to press upon the foot lever 75 to break the toggle as previously described after which the platform commences to descend gradually, it being checked from a rapid descent by the check 67 in the usual and well known manner.

As the rod 28 commences its descent the pawls 29 and 51 are engaged by the ends of the recesses 32 and 34 of the rod which turns both the pawls clockwise. The continued descent of the rod 28 brings the teeth 33 and 35 thereof into engagement with the teeth 51'' and 51' of the pawls as shown in dotted lines in Fig. 5 and when the rod is in its lowered position the pawls are again placed in an operable engagement with the rod as shown in Fig. 5.

What I claim is—

1. In an elevating truck in combination, a wheel supported base and a frame adapted to be elevated with respect to said base, pawl and ratchet mechanism for effecting the elevation of said frame comprising actuating and holding pawls, means for causing said actuating and holding pawls to become inoperative when the frame is fully elevated, a toggle lock between said base and said frame to hold the latter in elevated position when fully raised, and a loose play connection between said toggle lock, said base and said frame to permit an overthrow of said actuating pawl with respect to said holding pawl after said toggle fully reaches its locking position.

2. In an elevating truck having a pivoted steering handle, a platform adapted for a raising or lowering movement, mechanism to raise the said platform in a step-by-step manner, means operable by the said steering handle to actuate the said raising mechanism, step by step locking means to hold the said platform after each raising step, additional final stage locking means for holding the said platform when in a fully raised position, and means coacting with said elevating means and said step by step locking means whereby the movement of said platform to its fully raised position for being held by the final stage locking means, automatically renders said elevating means and said step-by-step locking means inoperative in preventing the descent of the platform upon any subsequent release of the final stage locking means.

3. In an elevating truck in combination, a wheel supported base and a frame adapted to be elevated with respect to said base, pawl and ratchet mechanism for effecting the elevation of said frame comprising actuating and holding pawls, means for causing said actuating and holding pawls to become inoperative when the frame is fully elevated, a toggle lock between said base and said frame to hold the latter in elevated position when fully raised, and a loose play connection between said toggle lock, said base and said frame to permit an overthrow of said actuating pawl with respect to said holding pawl after said toggle fully reaches its locking position, and means to disengage the said locking means whereby the said platform may lower and means operable by the lowering of said platform to restore the said raising and holding means to an operable engagement.

4. In an elevating truck having a pivoted steering handle, a platform adapted for a raising or lowering movement, mechanism to raise the said platform in a step-by-step manner, means operable by the said steering handle to actuate the said raising mechanism, step-by-step locking means to hold the said platform after each raising step, additional final stage locking means for the said platform when in a fully raised position comprising jointed links adapted to be moved by the raising of said platform from a collapsed non-locking relation to an extended locking relation and means coacting with said elevating means and said step-by-step locking means whereby the movement of said platform to its fully raised position for being held by the final stage locking means automatically renders said elevating means and said step-by-step locking means inoperative in preventing the descent of the platform upon any subsequent release of the final stage locking means.

5. In an elevating truck having a pivoted steering handle, a platform adapted for a raising or lowering movement, a mechanical jack pivotally connected to the said platform to effect a raising movement thereof, the said jack comprising, a notched rod, a pawl in engagement therewith and operable by the steering tongue to impart a step-by-step raising movement thereof, a holding pawl to check the said notched rod against descent after each raising step, recesses in the rod to permit disengagement of the said pawls and notched rod when the platform is fully elevated and jointed links to lock the said jack when in a fully raised position.

6. In an elevating truck having a pivoted handle, a platform adapted for a raising or lowering movement, a mechanical jack pivotally connected to the said platform to effect a raising movement thereof, said jack comprising, a toothed rod, an actuating pawl for engagement therewith and operable by the steering handle to impart a step-by-step raising movement to said rod, a holding pawl for said rod, a toggle lock comprising jointed links to lock the said platform in its fully raised position, said actuating and holding pawls arranged to become automatically disengaged from the said rod, when the platform is fully raised, and a manually operable lever to break said toggle lock whereby said platform may descend to a lowered position, the lowering movement of said rod acting to restore the said actuating and holding pawls to operable position.

7. In an elevating truck in combination, a base, a platform and a jack mechanism for elevating said platform comprising a toothed rod, an actuating sleeve reciprocably mounted on said rod and having an actuating pawl thereon, a holding sleeve pivotally mounted on said base in which the said rod is reciprocably supported, a holding pawl on said holding sleeve, and a locking toggle connecting said holding sleeve and said rod.

8. In an elevating truck having a pivoted steering handle, a platform adapted for a raising or lowering movement, mechanism to raise the said platform in a step-by-step manner, means operable by the said steering handle to actuate said raising mechanism, step-by-step means to hold the said platform after each raising step, additional final stage locking means for holding said platform when in a fully raised position, means coacting with said elevating means and said step-by-step locking means whereby the movement of said platform to its fully raised position for being held by the final stage locking means automatically renders said elevating means and said step-by-step locking means inoperative in preventing the descent of the platform upon any subsequent release of the final stage locking means, and manually operated means for releasing said final stage locking means to permit said platform to lower.

9. In an elevating truck having a pivoted steering handle, a platform adapted for a raising or lowering movement, pawl and ratchet mechanism operable by said steering handle to raise said platform in a step-by-step manner, comprising a ratchet member, an actuating pawl and a step-by-step holding pawl, additional final stage locking means for holding said platform when in its fully raised position and means coacting with said actuating pawl and said holding pawl whereby the movement of said platform to its fully raised position for being held by the final stage locking means automatically renders said actuating pawl and holding pawl inoperative in preventing the descent of the platform upon any subsequent release of said final stage locking means.

10. In an elevating truck having a pivoted steering handle, a platform adapted for a raising or lowering movement, mechanism operable by said steering handle to raise said platform in a step-by-step manner, comprising an actuating pawl and a holding pawl, additional locking means for holding said platform when in its fully raised position, means automatically effective when said platform is raised and locked in its uppermost position for rendering said actuating pawl and holding pawl inoperative, and means actuated by the lowering of said platform for restoring said actuating pawl and holding pawl to operative position.

11. In an elevating truck having a pivoted steering handle, a platform adapted for a raising or lowering movement, mechanism to raise the said platform in a step-by-step manner, means operable by the said steering handle to actuate said raising mechanism, means to hold the said platform after each raising step, additional locking means for holding said platform when in a fully raised position, means automatically rendering said first named holding means inoperative when said platform is fully raised, manually operated means for releasing said additional locking means to permit said platform to lower, and means actuated by the lowering of said platform for restoring said first named holding means to operative position.

12. In an elevating truck having a pivoted steering handle, a platform adapted for a raising or lowering movement, pawl and ratchet mechanism operable by said steering handle to raise said platform in a step-by-step manner, comprising a ratchet member, an actuating pawl and a holding pawl having operative and inoperative positions with respect to said ratchet member, additional locking means for holding said platform when in its fully raised position, and means automatically effective when said platform is raised and locked in its uppermost position to shift said actuating pawl and holding pawl from their operative positions to their inoperative positions with respect to said ratchet member, said automatically acting means comprising recesses in said ratchet member to receive said actuating pawl and holding pawl when in their inoperative positions.

13. In an elevating truck having a pivoted steering handle, a platform adapted for a raising or lowering movement, pawl and ratchet mechanism operable by said steering handle to raise said platform in a step-by-step manner, comprising a ratchet member, an actuating pawl and a holding pawl having operative and inoperative positions with respect to said ratchet member, additional final stage locking means for holding said platform when in its fully raised position, and means coacting with said actuating pawl and said holding pawl whereby movement of said platform to its fully raised position for being held by said final stage locking means automatically shifts said actuating pawl and holding pawl from their operative positions to their inoperative positions with respect to said ratchet member, said means acting when said platform is lowered to automatically restore said actuating pawl and said holding pawl to their operative positions with respect to said ratchet member.

In testimony whereof I have affixed my signature.

FRANK L. EIDMANN.